United States Patent
Troczynski et al.

(10) Patent No.: US 6,426,114 B1
(45) Date of Patent: Jul. 30, 2002

(54) SOL-GEL CALCIUM PHOSPHATE CERAMIC COATINGS AND METHOD OF MAKING SAME

(75) Inventors: Tomasz Troczynski, Vancouver; Dean-Mo Liu, Richmond, both of (CA)

(73) Assignee: The University of British Columbia, Vancouver (CA)

( * ) Notice: Subject to any disclaimer, the term of this patent is extended or adjusted under 35 U.S.C. 154(b) by 0 days.

(21) Appl. No.: 09/563,231

(22) Filed: May 2, 2000

(51) Int. Cl.$^7$ ............................. C01B 25/32; B05D 3/02

(52) U.S. Cl. ................. 427/2.27; 423/305; 423/308; 423/311; 433/212.1; 623/23.56

(58) Field of Search .............................. 423/308, 309, 423/311, 305; 433/212.1; 427/2.27; 623/23.56

(56) References Cited

U.S. PATENT DOCUMENTS

| | | | |
|---|---|---|---|
| 4,871,578 A | * | 10/1989 | Adam et al. ............... 427/2.27 |
| 5,074,916 A | | 12/1991 | Hench et al. |
| 5,178,901 A | * | 1/1993 | Toriyama et al. ........... 427/2.27 |
| 5,585,136 A | | 12/1996 | Barrow et al. |
| 5,658,332 A | | 8/1997 | Ducheyne et al. |
| 5,702,677 A | | 12/1997 | Shimp et al. |
| 5,730,598 A | * | 3/1998 | Story et al. ............... 427/2.27 |
| 5,766,669 A | * | 6/1998 | Pugh et al. ............... 427/2.27 |
| 5,783,217 A | * | 7/1998 | Lee et al. .................. 423/308 |
| 5,939,039 A | | 8/1999 | Sapieszko et al. |
| 6,010,713 A | | 1/2000 | Zhong et al. |
| RE36,573 E | | 2/2000 | Barrow et al. |
| 6,129,928 A | * | 10/2000 | Sarangapani et al. ...... 427/2.27 |

FOREIGN PATENT DOCUMENTS

JP   01230411   9/1989

OTHER PUBLICATIONS

P.O. Kroon, et al., Hydroxyapatite Coating of HIP Prosthese, J. Bone and Joint Surgery, vol. 74–B, No. 4, Jul. 1992, pp. 518–522.
Uwe Partenfelder, et al., A pyrolytic route for the formation of hyroxyapatite/fluoroapatite solid solutions, J. Mater. Sci. Mater. Med. 4 (1993) 292–295, (No month).
L.L. Hench, J. Am. Ceram. Soc., 74(7) 1487–1510 (1991). (No month).
M. Jarcho, Clin. Orthop. 157, 259–278 (1981). (No month).
R.Z. LeGeros, Clinical Materials 14 (1993) 65–88. (No month).
M. Itokazu,, et al., Biomaterials 19 (1998) 817–819. (No month).
F. Minguez, et al., Drugs Exptl. Clin. Res. XVI(5( 231–235 (1990). (No month).
W. Paul, et al., J. Mater. Sci. Mater. Med., 10 (1999) 383–388. (No month).
R.G.T. Geesink, Clin. Orthop. 261 (1990) 39–58. (No month).
J.A. Jansen, et al., Mater. Res., 25 (1991) 973–989. (No month).
T.W. Bauer, et al., Bone Join Surg., 73A (1991) 1439–1452. (No month).
Y. Masuda, et al., J. Ceram. Soc. Japan, 98 (1990) 1266–1277. (No month).
L.D. PIveteau, et al., J. Mater. Sci. Mater. Med., 10 (1999) 161–167. (No month).
A. Deptula, et al., J. Non–Crystalline Solids, 147/148 (1992) 537–541. (No month).
T. Brendel, et al., J. Mater. Sci. Mater. Med., 3 (1992) 175–179. (No month).
K.A. Gross, et al., J. Mater. Sci. Mater. Med., 9 (1998) 839–843. (No month).
P. Layrolle, et al., J. Am. Ceram. Soc., 81[6] (1998) 1421–1428. (No month).
S. W. Russell, et al., J. Am. Ceram. Soc., 79[4] (1996) 837–842. (No month).
K. Hwang, et al., Surf. Coating Tech., 115 (1999) 172–175. (No month).
A. Jillavenkatesa, et al., Mater. Sci., 33 (1998) 4111–419. (No month).
P. Layrolle, et al., Chem. Mater., 6 (1994) 1996–2004. (No month).
D.B. Haddow, et al., Sol–Gel Sci. Tech., 13 (1998) 261–265 (No month).
H. Takahashi, et al., Eur. J. Solid State Inorg. Chem., 32 (1995) 829–835. (No month).
D.B. Haddow, et al., J. Mater. Sci. Mater. Med., 7 (1996) 255–260, (No month).
A. Osaka, et al., J. Mater. Sco. Mater. Med. 7 (1991) 51–55, (No month).
A. Slosarczyk,, et al., J. Am. Ceram. Soc., 79 (1996) 2539–2544. (No month).
C.S. Chai, et al., Mater. Manuf. Processes, 10 (1995) 205–216. (No month).
D.M. Liu, et al., J. Mater. Sci. Mater. Med., 5 (1994) 147–153, (No month).
M. Yoshimura, et al., J. Mater. Sco., 29 (1994) 3399–3402, (No month).
K. de Groot, et al., J. Biomed. Mater. Res., 21 (1987) 1375–1381. (No month).

(List continued on next page.)

*Primary Examiner*—Wayne A. Langel
(74) *Attorney, Agent, or Firm*—Oyen Wiggs Green & Mutala

(57) ABSTRACT

This invention relates to novel sol-gel calcium phosphate, in particular hydroxyapatite ceramic coatings and processes of making same at low temperature. Such coatings are useful, inter alia, for dental implants and bone-metal contact appliances. A sol-gel process for preparing a crystallized hydroxyapatite which comprises: (a) hydrolysing a phosphor precursor in a water based medium; (b) adding a calcium salt precursor to the medium after the phosphite has been hydrolysed to obtain a hydroxyapatite gel; and (c) calcining the crystallized hydroxyapatite at a suitable elevated temperature.

17 Claims, No Drawings

OTHER PUBLICATIONS

C.C. Berndt, et al., Mater. Forum, 14 (1990) 161–173. (No month).

A.P. Ameen, et al., Clin. Oral Impl. Rers., 4 (1993) 144–150. (No month).

C.C. Ting, et al., J. Applied Phys. (to be published), (No month).

C.S. Chai, et al., Biomaterials, 19 (1998) 2291–2296. (No month).

Q. Qiu, et al., Cells and Mater., 3[4] (1993) 351–360. (No month).

F.W. Westheimer, et al., J. Am. Chem. Soc., 110 (1998) 181–185. (No month).

C.M. Lopatin, et al., Thin Solid Films, 326 (1998) 227–232. (No month).

W. Weng and J.L. Baptista, J. Mater. Sci, Mater. Med., 9 (1998) 159–163. (No month).

C. A. Simmons, et al., J. Biomed. Mater. Res., (1999) 127–138. (No month).

* cited by examiner

US 6,426,114 B1

SOL-GEL CALCIUM PHOSPHATE CERAMIC COATINGS AND METHOD OF MAKING SAME

FIELD OF THE INVENTION

This invention relates to novel sol-gel calcium phosphate, in particular, hydroxyapatite, ceramic coatings and processes of making same at low temperature. Such coatings are useful, inter alia, for dental implants and other bone-metal contact appliances.

BACKGROUND OF THE INVENTION

Osseointegration, or development of mechanical strength between an implant and bone, decides the success or failure of the implantation procedure. The implant will fail if good osseointegration is not achieved. Considerable research has been conducted to address this issue, primarily for dental and orthopaedic implants. The explored approaches generally involve modification of the surface and/or shape of the implant to facilitate the process of osseointegration.

Although there is no universally accepted solution to osseointegration, the concept of new, in-growing bone interlocking with a macroporous surface of the implant has attracted increasing interest among researchers and practitioners. The Endopore Dental Implant System, a Canadian invention marketed by Innova Corp. of Toronto, is one example of such surface-modified implant, wherein bone grows into the void space between sintered spheres of titanium alloy. For early strength development in such systems it is critical that bone in-growth into the pores is relatively rapid.

One promising approach is to use ceramics and specifically a sol-gel process to produce the ceramic. A sol-gel (SG) process provides superior chemical and physical homogeneity of the final ceramic product compared to other routes, such as solid-state synthesis, wet precipitation, or hydrothermal formation. The SG process allows the desired ceramic phase to synthesize at temperatures much lower than some of the alternate processes referred to above. In the SG coating process, substrate metal degradation due to thermally-induced phase transformations, microstructure modification or oxidation, is avoided. SG widens green-shaping capability, for example, and it is a very convenient method for deposition of ceramic coatings. The SG ceramic coating process has demonstrated a better structural integrity, purity and phase composition than the conventional methods, such as thermal spraying. The SG process also offers a cheaper and easier-to-form alternative for bioactive coating uses.

Hydroxyapatite (HA, $Ca_{10}(PO_4)_6(OH)_2$) ceramics belong to a class of calcium phosphate (CaP)-based materials, which have long been widely used as bone substitutes [1–3]. Recently, HA has been used for a variety of biomedical applications, including matrices for drug release control [4–6]. Due to the chemical similarity between HA and mineralized bone, synthetic HA exhibits strong affinity to host hard tissues. However, poor mechanical properties, e.g. low strength and toughness, restrict monolithic HA applications to those that require little or no load-bearing parts. HA coatings on metallic substrates (titanium alloys), offer great improvement in orthopaedic and dental applications [7–10]. Other members of the family of CaP-based materials, such as dicalcium phosphate ($CaHPO_4 \cdot 2H_2O$) or tricalcium phosphate ($Ca_3(PO_4)_2$), have also been used for the same purpose.

Sol-gel (SG) processing of CaP allows molecular-level mixing of the calcium and phosphor precursors [11–23], which improves chemical homogeneity of the resulting calcium phosphate, e.g. in particular HA, in comparison with conventional methods such as solid state reactions [24], wet precipitation [25,26], and hydrothermal synthesis [27]. The versatility of the SG method opens an opportunity to form thin film coatings in a rather simple process, and provides an alternative to thermal spraying which is currently widely used for biomedical applications [21, 28]. Numerous reports [29–31] in the prior art have indicated decomposition of the plasma sprayed HA to form other phases, such as tetracalcium phosphate, calcium oxide, and amorphous calcium phosphate. Some of these compounds are undesirable due to fast dissolution in vivo. Additionally, severe cracking of the plasma-sprayed layer (an nearest feature of plasma sprayed ceramics) frequently leads to accelerated implant failure.

The SG process provides significantly milder conditions of the synthesis of calcium phosphate films. This results in a much better structural integrity whereas the defects originated from plasma spraying can be largely avoided [28]. Furthermore, the lower temperature synthesis particularly benefits the metal substrates. However, thermal treatment of calcium phosphate, such as HA, sol-gel films under vacuum is frequently required to avoid metal oxidation. This leads to structural instability of the HA coating (i.e., evolution of structural water under vacuum environment) during thermal treatment. At temperatures below ~400° C., further oxidation of the underlying Ti or Ti alloy is negligible due to the surface presence of a natural protective oxide layer [32, 33].

Existing sol-gel hydroxyapatite (HA) synthesis methods require calcination temperatures higher than 500° C. to develop a well-crystallized HA phase. A high degree of HA crystallinity is required for bioactive applications, because partially crystalline, or amorphous calcium phosphate, such as HA, coatings are rapidly resorbed by living tissue. Metal alkoxides such as calcium diethoxide and phosphorus esters (for example, trialkyl phosphites and trialkyl phosphates), albeit expensive, are used as Ca and P precursors, respectively, in SG synthesis of CaP. However, these precursors are hygroscopic. This makes it necessary that the sol preparation to be conducted at a controlled (i.e. water-free) atmosphere. Furthermore, the inherent low hydrolysis activity of the trialkyl phosphates requires a prolonged time period for HA formation. For a highly-active phosphite, an aging time period over at least 24 hours is necessary to form the apatitic structure. The loss of the alkoxy phosphorus compounds due to their volatility also leads to the formation of non-stoichiometric products which are non-desirable for bioactive applications. Although the use of other phosphorus compounds, such as phenyldichlorophosphine, offers some improvement in this respect, a much higher temperature, for example, >800° C., is required to form a pure, crystallized HA. If the HA coating, or other CaP coating, is being processed, this temperature can easily damage the underlying metallic substrate, in particular Ti, which is one of the most commonly used metals for implants. Another shortcoming is that synthesized HA cannot be in-situ combined with bioactive polymers, or other organic materials.

The following is a brief review of pertinent literature in this field. Takahashi et al. [22] developed a gel route using calcium nitrate and phosphonoacetic acid ($HOOCCH_2PO(OH)_2$) in an aqueous solution and obtained a pure HA powder at 700° C. The crystallinity of HA increased with temperature up to 1100° C. Chai et al. [28] compared two calcium precursors, namely calcium diethoxide and calcium propionate, reacted with triethyl phosphite to form HA coating. They found that HA phase appeared at 500° C. for calcium propionate solution, but no HA formed when calcium ethoxide was used. However, they did not explain the influence of chemical nature of the precursors on phase formation.

Qiu et al. [35] used calcium nitrate and ammonium dihydrogen phosphate ($NH_4H_2PO_4$) to synthesize HA in highly basic solution. They obtained HA at calcination temperatures of 400° C.–1100° C. and indicated that the crystallinity of the HA improved with increasing temperature.

Haddow et al. [23] used calcium acetate with a number of phosphorus precursors, i.e. phosphoric acid ($H_3PO_4$), phosphorus pentoxide ($P_2O_5$), and triethyl phosphite for HA coating applications. They found the films prepared from triethyl phosphite and calcium acetate showed the best wetting characteristic and the temperature required to form an apatitic phase is greater than 600° C.

Lopatin et al. [37] used hydrated solution of N-butyl acid phosphate mixed with calcium nitrate tetrahydrate dissolved in 2-methoxyethanol to synthesize HA. The authors inidcated that HA phase was able to develop at a temperature as low as 300° C. However, the crystallinity of the HA phase was rather poor and improved only when the heat treatment temperature was above 500° C. However, increase in the firing temperature caused an increase of the amount of CaO and tricalcium phosphate, which are non-desirable impurity phases if present in mixture with HA.

Weng et al. [38] synthesized HA using a mixed ethanol solution of calcium nitrate and phosphorous pentoxide. A highly crystalline HA coating with dense morphology was obtained after heat treatment at 500° C. for 12–24 hours.

Phosphorus alkoxides, i.e. triethyl phosphate and triethyl phosphite, have been used as the phosphorus precursors for sol-gel HA synthesis in recent years [11–15,19,21–23]. The hydrolysis activity of the triethyl phosphate is poor and a higher solution temperature together with a prolonged time period (i.e. several days) is needed to form HA phase [19].

SUMMARY OF THE INVENTION

A novel sol-gel process for calcium phosphates, in particular hydroxyapatite (HA) synthesis is disclosed. The process allows the calcium phosphate to be obtained in a well crystallized form, at relatively low temperature, i.e. approximately 350° C. The crystallinity of the calcium phosphate phase obtained through the novel inventive process can be enhanced by appropriate use of water treatment during processing. Variation of Ca/P ratio in the sol-gel precursor mix allows one to obtain other than calcium phosphate phases, for example, hydroxyapatite, dicalcium phosphate, tricalcium phosphate or tetracalcium phosphate.

In another aspect, the invention is directed to a process which permits early osseointegration, or accelerated development of mechanical strength between an implant and adjacent bone. Bone in-growth into the interstices of the Endopore Dental Implant System is performed through deposition of thin (1–5 $\mu$m), uniform film of hydroxyapatite (HA) bioceramic coating into the open surface pores of the implant. The invention involves a novel sol-gel low-temperature route to thin-film HA coatings, which penetrate the pores and provide favorable micro-environment for accelerated bone in-growth and interlocking. The water-based sol-gel method according to the invention can produce well-crystallized HA coatings after heat treatment in air at only 350° C. This low crystallization temperature prevents undesirable deterioration (e.g. oxidation) of the Ti alloy implant surface.

The invention in one embodiment is directed to a sol-gel process for preparing a crystallized calcium phosphate, such as hydroxyapatite, which comprises: (a) hydrolysing a phosphor precursor in a water based medium; (b) adding a calcium salt precursor to the medium after the phosphite has been hydrolysed to obtain a calcium phosphate gel such as a hydroxyapatite gel; and (c) calcining the crystallized calcium phosphate, such as hydroxyapatite, at a suitable elevated temperature.

The phosphor precursor can be an alkyl phosphite and the alkyl phosphite can be triethyl phosphite. The calcium precursor can be a water soluble calcium salt and the water soluble calcium salt can be calcium nitrate.

The crystallized calcium phosphate can be calcined at a temperature of at least about 350° C. The crystallized calcium phosphate gel can be deposited on a titanium substrate.

The triethyl phosphite can be dissolved in a water-ethanol mixture. The calcium nitrate can be dissolved in anhydrous ethanol. The gel obtained by step (b) can be left to stand at ambient temperature for about eight hours, and can then be dried at a temperature of about 60° C.

DETAILED DESCRIPTION OF SPECIFIC EMBODIMENTS OF THE INVENTION

In the specification and the claims, it is understood that when appropriate, the term "calcium phosphate" is used generically and includes minerals such as hydroxyapatite, dicalcium phosphate, tricalcium phosphate and tetracalcium phosphate. Initial studies on the novel sol-gel route to calcium phosphate coatings performed by the inventors have led to an unexpected breakthrough in process development. The novel water-based method according to the invention has produced well-crystallized HA coatings and other calcium phosphate coatings after heat treatment in air at only 350C. This low crystallization temperature prevents any deterioration (e.g. oxidation) of the Ti alloy implant surface.

The invention pertains to a novel sol-gel (SG) process for water-based synthesis of calcium phosphate, in particular, hydroxyapatite (HA). The process allows the HA to be obtained in a crystallized form, at a relatively low temperature, i.e. ~350° C. This is an unexpectedly low crystallization temperature for HA sol-gel synthesis. The process provides excellent chemical and physical homogeneity of HA coatings. The low process temperature avoids substrate metal degradation due to thermally-induced phase transformation, microstructure deterioration, or oxidation.

A novel process route to well-crystallized calcium phosphate ceramics at low temperature has been invented. In the first stage of the process, phosphite sol was hydrolysed in a water-ethanol mixture (a concentration of 3M) in a sealed beaker until the phosphite was completely hydrolysed (which is easily recognized by loss of a characteristic phosphite odour), at ambient environment. A Ca salt (2M) was then dissolved in anhydrous ethanol, and the solution was then rapidly added into the hydrolysed phosphite sol. The sol was left at ambient environment for 8 hours, followed by drying in an oven at 60° C. As a result of this process, a white gel was obtained. For the sol containing Ca/P ratio required to produce HA, the gel showed a pure (single phase) apatitic structure with a Ca/P ratio of 1.666, identical to stoichiometric HA, after calcining at a temperature as low as 350° C. Varying the Ca/P ratio allows other calcium phosphates, such as dicalcium phosphate (Ca/P=1) or tricalcium phosphate (Ca/P=1.5), to be obtained. A coating produced using this process, and applied to Ti substrate, showed sufficient adhesive strength after curing at a temperature <450° C. The coating was crack-free and porous.

In another variant of the process, a pure water-based environment was used. The aqueous-based sols were prepared in the same manner as described above for the ethanol-based system. A higher rate of hydrolysis of the phosphite sol was observed. The mixed sol was dried while stirring. After 8 hours aging, a white gel appeared. For the sol containing a Ca/P ratio required to produce HA an apatitic structure with Ca/P ratio of 1.663, close to stoichiometric HA, resulted after calcining the gel at a temperature of 350° C. Both the ethanol-based and aqueous-based gels showed essentially the same apatitic structure at relatively low temperatures. This invention provides a method of synthesizing the HA ceramics via an aqueous-based sol-gel process.

The process for SG synthesis of calcium phosphate, in particular HA, bioactive ceramics disclosed herein offers the following advantages in comparison to existing sol-gel processes:

(1) The process can be completed in ambient environment (i.e. air), rather than in a controlled atmosphere.

(2) Loss of phosphorus-bearing compound is negligible.

(3) The synthesis requires short processing time (<24 hours) for HA sol preparation.

(4) The synthesis requires lower temperature (350° C.) and shorter time (<2 hours) of calcination for formation of high quality HA.

(5) The synthesis results in easy-to-form adhesive HA coating (on Ti substrate) at relatively low temperatures, which is a big advantage for biomedical applications.

(6) Porous HA coatings can be produced, which allows circulation of the physiological fluid throughout the coating structure and is potentially beneficial for biological events.

(7) Low temperature calcination of the novel HA coating on metals (such as Ti) permits thermal treatment in an air environment without the risk of severe metal oxidation and possible property degradation due to microstructural deterioration or phase transformations.

(8) A pure water-based solvent can be used for the HA synthesis, addressing both economic and ecological concerns.

Triethyl phosphite and calcium nitrate have been used as P and Ca precursors for HA synthesis. The hygroscopic nature of the triethyl phosphite enables the sol preparation to be conducted under dried atmosphere. In prior systems, non-aqueous solvents have been used for sol preparation. The phosphorus sol has been prepared by diluting and hydrolysing the phosphite in either pure water or a mixture of anhydrous ethanol and a small amount of water, followed by addition of Ca sol after the phosphite is hydrolysed. Experimental results have indicated that through this novel process a pure, well-crystallized HA phase can be synthesized at relatively low temperatures. The 350° C. crystallization of HA resulting from this process occurs at a temperature that is lower by about 200° C. to 300° C., than prior processes reported in the prior art. In fact, a temperature of 350° C. is an unexpectedly low and heretofore unknown temperature for the sol-gel processing of crystalline HA. This discovery means that the crystallization of HA structure can be significantly promoted at the sol, and then the gel preparation stages. Although the exact mechanism for the low-temperature crystallization of HA is not clear at present, and not wishing to be adversely bound by any theories, the presence of large amount of hydroxyl species originating from the initial water content in the dried gel may be a possible cause.

The temperature that is required to form the apatitic HA structure through SG depends largely on the chemical nature of the precursors. For example, calcium diethoxide ($Ca(OEt)_2$) and triethyl phosphate ($PO(OEt)_3$) can be used to form pure HA phase at temperatures above 600° C. Aging time longer than 24 h is critical for the solution system to stabilize such that a monophasic HA can be produced. Otherwise, large weight loss during pyrolysis and undesirable phases, such as CaO, can be observed.

A mixture of HA and CaO results at 775° C. if calcium acetate ($Ca(C_2H_3O_2)_2$) and triethyl phosphate are used as precursors. A further hydrochloric acid leaching is required in that process to eliminate CaO, leading to a pure HA phase. Low purity and poor crystallinity HA can be obtained at a temperatures as low as 400° C. using calcium nitrate ($Ca(NO_3)_2 \cdot 4H_2O$) and phenyldichlorophosphite ($C_6H_5PCl_2$) as precursors. An increase of the synthesis temperature to 900° C. resulted in pure, well-crystallized HA phase.

Triethyl phosphite offers a high activity for hydrolysis [35,36] and a recent $^{31}P$ NMR study revealed a valance transition from P(III) to P(V) upon ageing with Ca precursor to form HA within 24hr [15]. This indicates a nucleophilic addition of negatively-charged $OH^-$ groups to the positively-charged metal P, leading to an increased coordination number of the phosphorus atom which is essentially an indication towards the polymerization reaction [36]. After subsequent protonation of the alkoxide ligands (—OR) and removal of the charged ligand (—OR)$^+$, P—(OR) is hydrolysing to form P—(OH) [24,34], following interaction with Ca precursor to develop the apatitic structure. Upon aging, the hydrolysed phosphorus sol (which may be in a form of phosphoric ester [11,36], $P(OH)(OEt)_2$, or more generally, $P(OEt)_{3-x}(OH)_x$) interacts with Ca sol, possibly in the form of $Ca(OEt)_y(NO_3)_{2-y}$ in anhydrous ethanol and $Ca^{++}$ in water, to form oligomeric derivatives containing Ca—O—P bonds.

For the ethanol-based process, the reaction may proceed as follows:

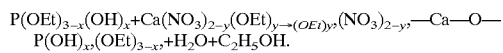

For aqueous-based process, an ionic derivative may possibly be developed by:

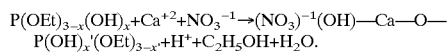

These reactions are rather simplified and idealized chemical forms, but offer some help in understanding of phase formation through the proposed process.

EXAMPLE

To prove the processing concepts outlined above, porous HA coatings have been deposited onto a Ti metal substrate. These pores were connected, ranging in size from 0.3 to 1 μm, which may be an advantage for the circulation of the physiological fluid throughout the coating. Substantial adhesion between the coating and the substrate was observed in simple, qualitative rubbing experiments. This proves the feasibility of the technique according to the invention. The variables controlling sol preparation, coating deposition and heat treatment can be identified by performing routine fractional factorial experiments designed and executed to rank their effect on HA crystallization temperature and kinetics. Other responses of the system, e.g. coating integrity (in terms of porosity, microstructure, adhesion, wear) as well as thickness can also be monitored and empirically modeled in terms of the most significant variables. The effect of transition from flat test coupons to the porous Ti6Al4V implant surface (35–40% pores, 50–200 µm in size) can be monitored by SEM studies. Precursor penetration into the open pores and coating uniformity within the pores can be determined by standard techniques.

The coated and uncoated implants will be placed transversely in the medial femoral condyles of mature New Zealand white rabbits following the guidelines of Canadian Council on Animal Care, as previously described [39]. After 0, 4, 8, 16 and 32 days of healing the progress of osseointegration will be comparatively assessed using pull-out tests, SEM and histological examination.

The nature of SG processes is such that volume of the resulting ceramic is significantly smaller than the volume of the precursor gel because of the presence of a large amount of residues. Equivalently, the processing strain may reach 30–40% linear, which frequently leads to cracking of bulk objects or thicker coatings. The resulting loss of structural integrity due to crack formation might be a possible disadvantage for coating application. If this does happen, a thinner coating may be a plausible alternative. Another countermeasure is to follow a composite sol-gel (CSG) route. In this route, a calcined HA powder will be dispersed into SG precursors to limit the processing strain. CSG allows substantial avoidance of cracking of SG derived ceramics, and thus is amenable to process thick coatings and bulk shapes.

The novel process according to the invention will allow rapid osseointegration of dental implants, and possibly also orthopaedic implants. This issue is of fundamental importance in view of general aging of the population of the world and the related increase of use of biomaterials. As the process according to the invention is generic for all implantation procedures involving implants, the novel technique is highly useful and should significantly and directly affect quality of life of human beings.

The nature of the process for HA coatings deposition according to the invention is such that it can be easily incorporated into the current production practice to manufacture dental implants, such as the Endopore Dental Implant System. The water-based liquid precursors to HA ceramic coatings, simple deposition technique (e.g. dipping or spin-coating) and low-temperature heat treatment in air make the process not unlike simple painting-curing operation which can be commercialized with relatively small effort.

Bone in-growth into the surface voids of the Endopore Dental Implant System can be accelerated through deposition of a thin (1–5 µm), uniform film of hydroxyapatite (HA) bioceramic coating into the open surface pores of the implant. Although it is known that HA, which is the principal inorganic component of bone, improves osseointegration, none of the existing techniques can produce an acceptable treatment for the porous implants. In particular, the widely used plasma spraying of HA results in thick (10–100 µm), poor quality coatings which cannot penetrate the surface of the Endopore Dental Implant System. In fact, such a film seals the surface pores and hampers osseointegration through pore in-growth. The subject invention provides a novel sol-gel route to thin-film calcium phosphate, such as HA coatings, which will penetrate the pores and provide favorable micro-environment for accelerated bone in-growth and interlocking. This process allows for early development of osseointegration for dental implants.

The process according to the invention can be utilized to synthesize high-purity calcium phosphate ceramics of different physical forms, at relatively low temperatures. Beyond ceramic coatings, the invention has application in the following areas:

granules or bulk shapes for artificial bone filler/bone reconstruction;

coatings for orthopaedic and dental uses;

organic/inorganic composites, including HA in combination with other materials such as polymers and ceramics, and proteins to form nano- and bio-composites with controlled drug release function and/or bone growth control functions.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

REFERENCES

1. L. L. Hench, J. Amer. Ceram. Soc., 74, 14887–1510 (1991).
2. M. Jarcho, Clin. Orthop., 157, 259–278 (1981).
3. R. Z. Legeros, Adv. Dent. Res., 2, 164–168 (1988).
4. M. Itokazu, W. Yang, T. Aoki, and N. Kato, Biomaterials, 19, 817–819, (1998).
5. F. Minguez, M.Agra,S.Luruena, C.Ramos, and J. Prieto, Drugs Exp. Clin. Res., 16[5], 231–235 (1990).
6. W. Paul and C. P. Sharma, J. Mater. Sci. Mater. Med., 10, 383–388 (1999).
7. R. G. T. Geesink, Clin. Orthop., 261, 39–58 (1990).
8. J. A. Jansen, J. Van de Waerden, J. G. C. Wolke, K.Groot, J. Biomed. Mater. Res., 25, 973–989 (1991).
9. P. K. Stephenson, M. A. R. Freeman, P. A. Rovall, J. Germain, M. Tuke, and C. J. Piris, J. Arthoplasty, 6, 51–58 (1991).
10. T. W. Bauer, R. Geesink, R. Zimmerman, J. T. Mcmahon, J. Bone Joint Surg., 73A, 1439–1452 (1991).
11. Y. Masuda, K. Matubara, and S. Sakka, J. Ceram. Soc. Japan, 98, 1266–1277 (1990).
12. A. Deptula, W. Lada, T. Olczak, A. Borello, C. Alvani, and A. di Bartolomeo, J. Non-Crystalline Solids, 147/148, 537–541 (1992).
13. L. D. Piveteau, M. I. Girona, L. Schlapbach, P. Barboux, J. P. Boilot, and B. Gasser, J. Mater. Sci. Mater. Med., 10, 161–167 (1999).
14. T. Brendel, A. Engel, and C. Russel, J. Mater. Sci. Mater. Med., 3, 175–179 (1992).
15. K. A. Gross, C. S. Chai, G. S. K. Kannangara, B. Bin-Nissan, and L. Hanley, J. Mater. Sci. Mater. Med., 9, 839–843 (1998).
16. P. Layrolle, A. Ito, and T. Takishi, J. Am. Ceram. Soc., 81[6], 1421–1428 (1998).
17. S. W. Russel, K. A. Luptak, C. T. A. Suchicital, T. L. Alford, and V. B. Pizzicoui, J. Am. Ceram. Soc., 79[4], 837–842 (1996).
18. K. Hwang and Y. Lim, Surf. Coating Tech., 115, 172–175 (1999).
19. A. Jillavenkatesa and R. A. Condrate, J. Mater. Sci., 33, 4111–4119 (1998).
20. P. Layrolle and A. Lebugle, Chem. Mater., 6, 1996–2004 (1994).

21. D. B. Haddow, P. F. James, and R. Van Noort, J. Sol-Gel Sci. Tech., 13, 261–265 (1998).
22. H. Takahashi, M.Yashima, M.Kakihana, MYoshimura, E. J. Sol. St. Inorg. Chem., 32, 829–835 (1995).
23. D. B. Haddow, P. F. James, and R. Van Noort, J. Mater. Sci. Mater. Med., 7, 255–260 (1996).
24. R. A. Young and D. W. Holcomb, Calif. Tissue Int., 34, 17–32 (1982).
25. A. Osaka, Y. Miuro, K. Takeuchi, M. Asada, K. Takahashi, J. Mater. Sci. Mater. Med., 2, 51–55 (1991).
26. A. Slosarczyk, E. Stobierska, Z. Paszkiewicz, M. Gawlick, J. Am. Ceram. Soc., 79, 2539–2544 (1996).
27. M. Yoshimura, H. Suda, K. Okamoto, and K. Ioku, J. Mater. Sci., 29, 3399–3402 (1994).
28. C. S. Chai, B. Ben-Nissan, S. Pyke, and L. Evans, Mater. Manuf. Processes, 10, 205–216 (1995).
29. D. M. Liu, H. M. Chou, and J. D. Wu, J. Mater. Sci. Mater. Med., 5, 147–153 (1994).
30. K. de Groot, R. Greesink, C. Klein, P. Serekian, J. Biomed. Mater. Res., 21, 1375–1381 (1987).
31. C. C. Berndt, G. N. Haddad, A. J. D. Farmer, and K. A. Gross, Mater. Forum, 14, 161–173 (1990).
32. A. P. Ameen, R. D. Short, R. Johns, and G. Schwach, Clin. Oral Impl. Rers., 4, 144 (1993).
33. C. C. Ting, S. Y. Chen, and D. M. Liu, J. Applied Phys. (to be published).
34. C. S. Chai, K. A. Gross, and B. Ben-Nissan, Biomaterials, 19, 2291–2296 (1998).
35. Q. Qiu, P. Vincent, B. Lowenberg, M. Sayer, and J. E. Davies, Cells and Mater., 3[4], 351–360 (1993).
36. F. H. Westheimer, S. Huang, and F. Coritz, J. Am. Chem. Soc., 110, 181–185 (1988).
37. C. M. Lopatin, V. Pizziconi, T. L. Alford, and T. Laursen, Thin Solid Films, 326, 227–232 (1998).
38. W. Weng and J. L. Baptista, J. Mater. Sci.: Mater. Medicine, 9, 159–163 (1998).
39. C. A. Simmons, N. Valiquette and R. M. Pilliar, J. Biomed. Mater. Res., 127–138 (1999).

What is claimed is:

1. A sol-gel process for preparing a crystallized calcium phosphate which comprises:
   (a) hydrolysing a phosphor precursor in a water based medium;
   (b) adding a calcium salt precursor to the medium after the phosphite in the precursor has been hydrolysed to obtain a calcium phosphate gel; and
   (c) calcining the calcium phosphate gel at an elevated temperature which is suitable for forming a crystallized calcium phosphate.

2. A process as claimed in claim 1 wherein the crystallized calcium phosphate is hydroxyapatite.

3. A process as claimed in claim 1 wherein the crystallized calcium phosphate is dicalcium phosphate.

4. A process as claimed in claim 1 wherein the crystallized calcium phosphate is tricalcium phosphate.

5. A process as claimed in claim 1 wherein the crystallized calcium phosphate is tetracalcium phosphate.

6. A process as claimed in claim 1 wherein the phosphor precursor is an alkyl phosphite.

7. A process as claimed in claim 1 wherein the phosphor precursor is triethyl phosphite.

8. A process as claimed in claim 1 wherein the calcium precursor is a water soluble calcium salt.

9. A process as claimed in claim 1 wherein the calcium precursor is calcium nitrate.

10. A process as claimed in claim 7 wherein the triethyl phosphite is dissolved in a water-ethanol mixture.

11. A process as claimed in claim 9 wherein the calcium nitrate is dissolved in anhydrous ethanol.

12. A process as claimed in claim 1 wherein the gel obtained by step (b) is left to stand at ambient temperature for about 8 hours, and is then dried at a temperature of about 60° C.

13. A sol-gel process for preparing a crystallized hydroxyapatite which comprises:
    (a) hydrolysing a phosphor precursor in a water-based medium;
    (b) adding a calcium salt precursor to the medium after the phosphite in the precursor has been hydrolysed to obtain a hydroxyapatite gel; and
    (c) calcining the hydroxyapatite gel at an elevated temperature which is suitable to produce a crystallized hydroxyapatite.

14. A process as claimed in claim 13 wherein the phosphor precursor is triethyl phosphite.

15. A process as claimed in claim 14 wherein the calcium precursor is calcium nitrate.

16. A process as claimed in claim 15 wherein the hydroxyapatite gel is calcined at a temperature of at least about 350° C.

17. A process as claimed in claim 15 wherein the hydroxyapatite gel is deposited on a titanium substrate.

* * * * *